US012665260B2

(12) United States Patent
Shin et al.

(10) Patent No.: US 12,665,260 B2
(45) Date of Patent: Jun. 23, 2026

(54) SEPARATOR FOR LITHIUM SECONDARY BATTERIES WITH IMPROVED HEAT RESISTANCE

(71) Applicant: LG ENERGY SOLUTION, LTD., Seoul (KR)

(72) Inventors: Jin Young Shin, Daejeon (KR); Kyung Ryun Ka, Daejeon (KR); So Mi Jeong, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 578 days.

(21) Appl. No.: 18/016,800

(22) PCT Filed: Mar. 18, 2022

(86) PCT No.: PCT/KR2022/003842

§ 371 (c)(1),
(2) Date: Jan. 18, 2023

(87) PCT Pub. No.: WO2022/197156

PCT Pub. Date: Sep. 22, 2022

(65) Prior Publication Data

US 2023/0275322 A1 Aug. 31, 2023

(30) Foreign Application Priority Data

Mar. 19, 2021 (KR) ........................ 10-2021-0035591
Mar. 17, 2022 (KR) ........................ 10-2022-0033523

(51) Int. Cl.
*H01M 50/489* (2021.01)
*H01M 50/417* (2021.01)
(Continued)

(52) U.S. Cl.
CPC ....... *H01M 50/489* (2021.01); *H01M 50/417* (2021.01); *H01M 50/446* (2021.01); *H01M 50/457* (2021.01)

(58) Field of Classification Search
CPC ............. H01M 50/489; H01M 50/417; H01M 50/457; H01M 50/446
See application file for complete search history.

(56) References Cited

U.S. PATENT DOCUMENTS

2007/0108422 A1 5/2007 Horiuchi et al.
2015/0325829 A1 11/2015 Lee
(Continued)

FOREIGN PATENT DOCUMENTS

CN 107230767 A 10/2017
CN 108493389 A1 9/2018
(Continued)

OTHER PUBLICATIONS

International Search Report for PCT/KR2022/003842 (PCT/ISA/210) mailed on Jul. 4, 2022.
(Continued)

*Primary Examiner* — Michael N Orlando
(74) *Attorney, Agent, or Firm* — Birch, Stewart, Kolasch & Birch, LLP

(57) ABSTRACT

A separator for a lithium secondary battery, the separator including a separator substrate including a porous polymer resin and a heat resistance layer on at least one side of the separator substrate. The heat resistance layer includes a phenolic resin configured to be hardened when heated. The heat shrinkage at a high temperature is improved, and it is possible to prevent short circuit between electrodes.

7 Claims, 2 Drawing Sheets

(51) Int. Cl.
*H01M 50/446* (2021.01)
*H01M 50/457* (2021.01)

(56) References Cited

U.S. PATENT DOCUMENTS

| | | | | |
|---|---|---|---|---|
| 2016/0248063 | A1* | 8/2016 | Jang | H01M 50/429 |
| 2017/0133654 | A1* | 5/2017 | Cho | C09D 179/08 |
| 2018/0079938 | A1* | 3/2018 | Mifuka | C08G 8/10 |
| 2020/0157058 | A1* | 5/2020 | Lee | H01M 6/166 |
| 2020/0185676 | A1* | 6/2020 | Lee | H01M 10/052 |
| 2021/0074984 | A1 | 3/2021 | Lee et al. | |
| 2022/0102810 | A1 | 3/2022 | Kim et al. | |
| 2023/0090568 | A1 | 3/2023 | Jeong et al. | |
| 2023/0098650 | A1 | 3/2023 | Jeong et al. | |

FOREIGN PATENT DOCUMENTS

| | | | | |
|---|---|---|---|---|
| CN | 109167007 | A | 1/2019 | |
| EP | 4 117 105 | A1 | 1/2023 | |
| EP | 4 131 622 | A1 | 2/2023 | |
| EP | 3614459 | B1 * | 10/2024 | H01M 50/457 |
| JP | 2000-21381 | A | 1/2000 | |
| JP | 2001-176481 | A | 6/2001 | |
| JP | 2002-75357 | A | 3/2002 | |
| JP | 2010-231897 | A | 10/2010 | |
| JP | 4915637 | B2 | 4/2012 | |
| JP | 4918984 | B2 | 4/2012 | |
| KR | 10-1267283 | B1 | 5/2013 | |
| KR | 10-2016-0109669 | A | 9/2016 | |
| KR | 10-2017-0053495 | A | 5/2017 | |
| KR | 10-1888732 | B1 | 8/2018 | |
| KR | 10-2019-0092316 | A | 8/2019 | |
| KR | 10-2020-0050791 | A | 5/2020 | |
| KR | 10-2020-0085185 | A | 7/2020 | |

OTHER PUBLICATIONS

Extended European Search Report for European Application No. 22771822.8, dated Apr. 7, 2025.

* cited by examiner

【FIG. 1】
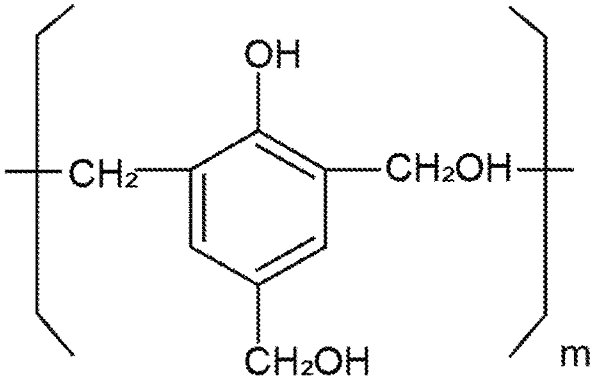
【FIG. 2】
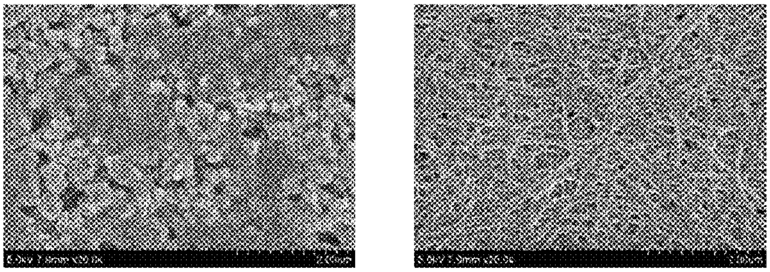
<Top> <Back>
【FIG. 3】
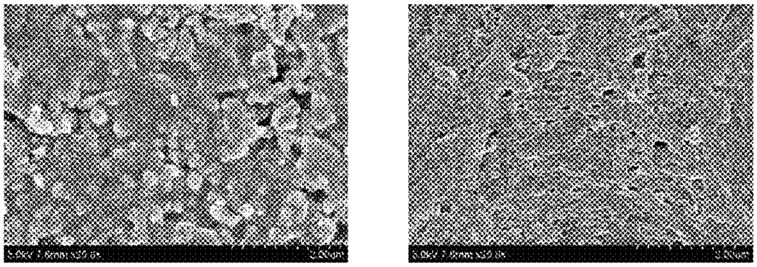
<Top> <Back>
【FIG. 4】
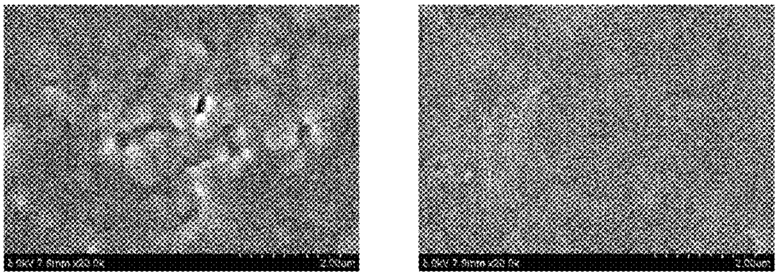
<Top> <Back>

【FIG. 5】
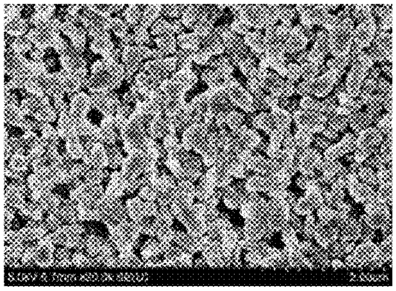
<Top>
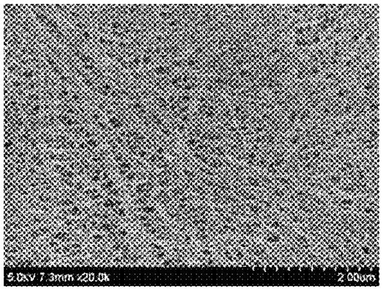
<Back>
【FIG. 6】
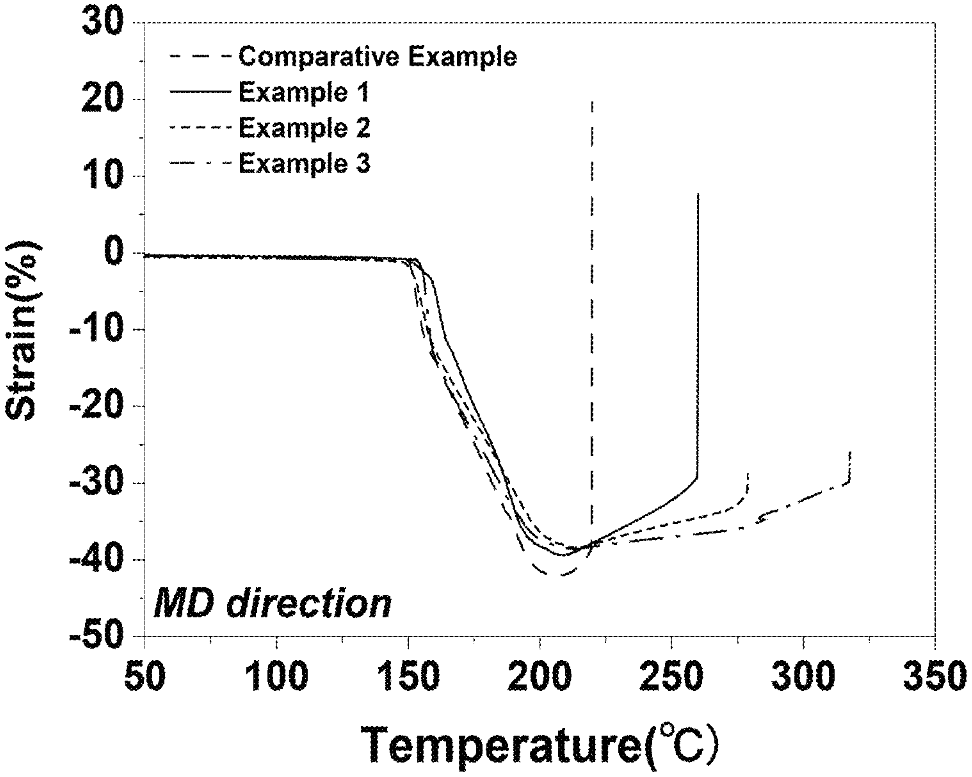

SEPARATOR FOR LITHIUM SECONDARY BATTERIES WITH IMPROVED HEAT RESISTANCE

TECHNICAL FIELD

This application claims the benefit of priority to Korean Patent Application No. 2021-0035591 filed on Mar. 19, 2021 and Korean Patent Application No. 2022-0033523 filed on Mar. 17, 2022 with the Korean Intellectual Property Office, the disclosures of which are incorporated herein by reference in theirs entireties.

The present invention relates to a separator for lithium secondary batteries with improved heat resistance. More particularly, the present invention relates to a separator for lithium secondary batteries configured such that heat shrink at a high temperature is reduced, whereby heat resistance is improved.

BACKGROUND ART

A lithium secondary battery may be manufactured by receiving an electrode assembly configured such that a separator is interposed between a positive electrode and a negative electrode in a battery case, injecting an electrolytic solution into the battery case, and hermetically sealing the battery case.

The separator, which interrupts electrical connection between the positive electrode and the negative electrode in order to secure insulation, may be configured to have a structure in which a coating layer including an inorganic material and a binder is formed on a polyolefin-based substrate made of a porous material such that lithium ions are movable. A polyolefin-based material has low heat resistance, and high-temperature safety and mechanical properties may be improved by addition of the coating layer.

In order to increase the strength of the separator and to thin the separator, the separator may be uniaxially or biaxially oriented. When the temperature of the lithium secondary battery increases, the separator may shrink in the oriented direction. As a result, short circuit may occur due to contact between the positive electrode and the negative electrode in the electrode assembly, which may cause ignition and explosion of the lithium secondary battery.

When the capacity per volume of the lithium secondary battery increases, the heat generation amount at the time of internal short circuit increases. Various research to solve a safety problem with a high-capacity lithium secondary battery has been conducted.

Patent Document 1 discloses a separator manufacturing method of coating one surface of a porous substrate with an aqueous inorganic dispersion solution to form an inorganic layer and forming an electrode adhesion layer made of a binder composition on each of opposite surfaces of the porous substrate having the inorganic layer formed thereon, whereby the force of adhesion of the separator to an electrode is increased.

In Patent Document 1, the force of adhesion between the separator and the electrode is increased, whereby it is possible to prevent short circuit between a positive electrode and a negative electrode. However, the resistance of the separator may be increased due to the electrode adhesion layer, and technology capable of inhibiting shrink of the separator is not suggested.

Patent Document 2 discloses a composite separator for secondary batteries, the composite separator including a heat resistance layer formed on one surface or opposite surfaces of a porous substrate layer and an adhesive layer formed on the heat resistance layer, wherein inorganic particles are connected and fixed to each other by a binder polymer in the heat resistance layer, and the adhesive layer contains polymer particles.

The separator of Patent Document 2 includes the heat resistance layer and the adhesive layer, thereby showing the results in which the strength of adhesion between the separator and an electrode at a high temperature is increased and heat shrinkage is reduced; however, air permeability is increased due to addition of the heat resistance layer, and therefore it is not possible to solve problems in that an electrolytic solution impregnation rate is reduced and resistance is increased.

In a separator for lithium secondary batteries, therefore, there is a need for technology capable of reducing heat shrinkage of the separator without provision of an adhesive layer, whereby it is possible to prevent internal short circuit between a positive electrode and a negative electrode, and improving heat resistance of the separator.

PRIOR ART DOCUMENTS (Patent Document 1) Korean Registered Patent Publication No. 1888732 (2018.08.14)

(Patent Document 2) Korean Patent Application Publication No. 2016-0109669 (2016.09.21)

DISCLOSURE

Technical Problem

The present invention has been made in view of the above problems, and it is an object of the present invention to provide a separator for lithium secondary batteries configured such that short circuit between a positive electrode and a negative electrode at a high temperature is prevented, whereby safety and heat resistance are improved.

Technical Solution

A separator for a lithium secondary battery according to the present invention to accomplish the above object includes a separator substrate including a porous polymer resin and a heat resistance layer on at least one side of the separator substrate, the heat resistance layer including a phenolic resin configured to be hardened when heated.

An inorganic layer may be fer-med present between the separator substrate and the heat resistance layer.

The phenolic resin may include a resol-containing phenolic resin.

The resol-containing phenolic resin may be present in the heat resistance layer in an amount ranging from 0.5 wt % to 2.0 wt % based on the total solid content of the heat resistance layer.

A machine direction (MD-direction) and a transverse direction (TD-direction) heat shrinkage of the separator for lithium secondary batteries at 150° C. may be 60% or less.

The loading amount of the heat resistance layer may be 2.0 $g/m^2$ or less.

An inorganic layer may be present on at least one of a first surface of the separator substrate and a second surface of the separator substrate, and the heat resistance layer may be present on an upper surface of the inorganic layer and an upper surface of the separator substrate on which the inorganic layer is not formed.

The separator may be an aqueous separator.

The present invention provides a cylindrical lithium secondary battery having a structure in which an electrode assembly including the separator for lithium secondary batteries is received in a cylindrical battery case.

The present invention provides a battery pack including the lithium secondary battery as a unit cell, wherein the battery pack is suitable for use as an energy source of an electric vehicle, a hybrid electric vehicle, a plug-in hybrid electric vehicle, or an energy storage system.

In addition, the present invention may provide various combinations of the above solving means.

Advantageous Effects

As is apparent from the above description, in a separator for lithium secondary batteries according to the present invention, heat shrinkage at a high temperature is remarkably improved, whereby it is possible to prevent short circuit between a positive electrode and a negative electrode due to shrink of the separator when a lithium secondary battery is under a high-temperature environment.

In addition, it is possible to maintain the resistance of the separator at a low level even in the state in which a heat resistance layer is formed, whereby it is possible to prevent deterioration in performance of the lithium secondary battery.

DESCRIPTION OF DRAWINGS

FIG. 1 is a structural formula of a resol-based phenolic resin.

FIG. 2 is an FE-SEM photograph of the surface of a separator manufactured according to Example 1.

FIG. 3 is an FE-SEM photograph of the surface of a separator manufactured according to Example 2.

FIG. 4 is an FE-SEM photograph of the surface of a separator manufactured according to Example 3.

FIG. 5 is an FE-SEM photograph of the surface of a separator manufactured according to Comparative Example 1.

FIG. 6 is a DMA evaluation graph.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

A separator for lithium secondary batteries according to the present invention may include a separator substrate configured to have a porous structure, the separator substrate being made of a polymer resin, and a heat resistance layer added to at least one side of the separator substrate, the heat resistance layer including a phenolic resin configured to be hardened when heated.

For example, the separator substrate may be at least one selected from the group consisting of high-density polyethylene, low-density polyethylene, linear low-density polyethylene, ultra-high-molecular-weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylenesulfidro, polyethylene naphthalene, and a mixture thereof.

Even during normal use of a lithium secondary battery, such as repetitive charging and discharging, the temperature of a battery cell is increased by heat generated in the battery cell. The separator substrate may be manufactured through uniaxial or biaxial orientation, and a separator thus oriented may shrink to the original size thereof when the temperature increases.

In the case in which a material that exhibits high heat shrinkage is used, as described above, when the separator shrinks during use of the lithium secondary battery, a positive electrode and a negative electrode come into contact with each other, whereby internal short circuit may occur.

Accordingly, in the present invention, the heat resistance layer may be added to at least one side surface of the separator substrate in order to reduce heat shrinkage of the separator.

In a concrete example, the heat resistance layer may include a resol-based phenolic resin configured to be hardened at a high temperature. FIG. 1 shows a structural formula of the resol-based phenolic resin.

Specifically, the heat resistance layer may include a resol-based phenolic resin configured to be hardened at a high temperature, as follows. In the present invention, as described above, the heat resistance layer including the resol-based phenolic resin located at the outermost side of the separator may be hardened when the temperature of the lithium secondary battery increases, whereby it is possible to prevent shrinkage of the separator, and therefore it is possible to provide a separator with improved heat resistance.

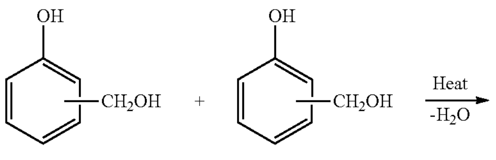

-continued

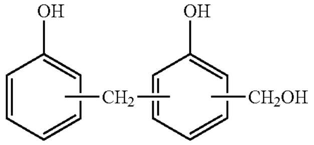

In general, when only a separator substrate including a polyolefin-based polymer resin is used as the separator, not only does heat resistance of the separator become a problem but also there is a problem in that the mechanical strength of the separator is low. In order to remedy the above problems, an inorganic layer including an inorganic material and a binder may be provided on one surface or opposite surfaces of the separator substrate.

In the present invention, the heat resistance layer is added to at least one side of the separator substrate, wherein an inorganic layer may be formed on any one of a first surface and a second surface of the separator substrate, and the heat resistance layer may be added to an upper surface of the inorganic layer and an upper surface of the separator substrate, on which the inorganic layer is not formed. That is, the inorganic layer may be formed on the surface of the separator substrate on which the inorganic layer is formed, which is one of the first surface and the second surface, between the separator substrate and the heat resistance layer.

Alternatively, a first inorganic layer and a second inorganic layer may be formed on the first surface and the second surface of the separator substrate, respectively, and the heat resistance layer may be added to each of the first inorganic layer and the second inorganic layer.

For example, when an electrode assembly for cylindrical secondary batteries is manufactured, it is possible to increase the capacity and energy density of a battery by using a single-sided coated separator having an inorganic layer formed on only one surface of a separator substrate, since safety securing criteria are relatively low due to the characteristics of the cylindrical secondary batteries.

Alternatively, when an electrode assembly for pouch-shaped secondary batteries is manufactured, it is possible to obtain a heat resistance improvement effect by using a double-sided coated separator having inorganic layers formed on opposite surfaces of a separator substrate, since safety securing criteria are relatively high.

The inorganic layer may include an inorganic material and a binder. The binder may maintain bonding between inorganic particles and may increase the force of adhesion between an electrode and the separator.

The kind of the binder is not particularly restricted as long as the binder does not cause any chemical change in a separator coating layer. For example, the binder may be made of at least one selected from the group consisting of polyolefin, such as polyethylene or polypropylene; a fluorine-containing resin, such as polyvinylidene fluoride or polytetrafluoroethylene; fluorine-containing rubber, such as a vinylidene fluoride-hexafluoropropylene-tetrafluoroethylene copolymer or an ethylene-tetrafluoroethylene copolymer; a styrene-butadiene copolymer or a hydride thereof; a (meth)acrylic acid ester copolymer, such as a methacrylic acid ester copolymer, an acrylonitrile acrylic acid ester copolymer, or a styrene acrylic acid ester copolymer; rubber, such as ethylene propylene rubber; polyvinyl acetate; a resin having a melting point or a glass transition temperature of 180° C. or higher, such as polyphenylene ether, polysulfone, polyethersulfone, polyphenylene sulfide, polyetherimide, polyamide, polyimide, polyamide imide, polyetheramide, polyester, aromatic polyester, or polyetheretherketone; polycarbonate; polyacetal; and a water soluble resin, such as carboxyalkyl cellulose, alkyl cellulose, hydroxyalkyl cellulose, starch, polyvinyl alcohol, sodium alginate, polyethylene glycol, cellulose ester, polyacrylic acid, polyacrylamide, or polymethacrylic acid.

The inorganic material constituting the inorganic layer may be at least one selected from the group consisting of $BaTiO_3$, $Pb(Zr,Ti)O_3$ (PZT), $Pb_{1-x}La_xZr_{1-y}Ti_yO_3$ (PLZT) ($0<x<1$, $0<y<1$), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, lithium phosphate ($Li_3PO_4$), lithium titanium phosphate ($Li_xTi_y(PO_4)_3$, $0<x<2$, $0<y<3$), (LiAlTiP) $_xO_y$-based glass ($0<x<4$, $0<y<13$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), and a mixture thereof; however, the present invention is not limited thereto.

A method of coating the inorganic layer and a method of coating the heat resistance layer are not particularly restricted, and ordinary coating methods known in the art to which the present invention pertains may be used. For example, various methods, such as dip coating, die coating, roll coating, comma coating, spin coating, spray coating, or a combination thereof, may be used.

The resol-based phenolic resin included in the heat resistance layer may be included so as to account for 0.5 wt % to 2.0 wt %, specifically 1.0 wt % to 2.0 wt %, based on the total solid content of the heat resistance layer.

If the content of the resol-based phenolic resin is less than 0.5 wt % based on the total solid content of the heat resistance layer, it is difficult to achieve a heat resistance improvement effect, which is undesirable. If the content of the resol-based phenolic resin is greater than 2.0 wt %, the resistance of the separator is increased, which is also undesirable.

In the separator according to the present invention, if the loading amount of the heat resistance layer applied to the inorganic layer or the separator substrate is too large, resistance increase may be caused. For example, the loading amount may be 2.0 $g/m^2$ or less, specifically 1.0 $g/m^2$ or less, more specifically 0.5 $g/m^2$ or less.

In a concrete example, in order to form the heat resistance layer at the outermost side of the separator, resol-based phenol may be dissolved in a non-aqueous organic solvent, such as acetone, to manufacture a coating slurry, and the separator may be impregnated with the coating slurry such that the separator is coated with the coating slurry by dip coating.

The separator is in a state in which the inorganic layer is formed on at least one surface of the separator substrate. If an oil-based separator using an oil-based solvent as the solvent of the inorganic layer is impregnated with the coating slurry, the inorganic layer may be melted and separated.

In the present invention, therefore, a water-based separator using water as the solvent of the inorganic layer is used, whereby it is possible to prevent the inorganic layer from being melted during formation of the heat resistance layer.

In addition, the present invention provides a battery cell including an electrode assembly configured to have a structure in which the separator for lithium secondary batteries is interposed between a positive electrode and a negative electrode, and the battery cell may be a lithium secondary battery configured to have a structure in which the electrode assembly is impregnated with a non-aqueous electrolytic solution containing a lithium salt.

Based on the shape of a battery case, the lithium secondary battery may be a pouch-shaped secondary battery, a cylindrical secondary battery, or a prismatic secondary battery.

For example, the positive electrode may be manufactured by applying a positive electrode mixture including a positive electrode active material to a positive electrode current collector and drying the positive electrode mixture. A binder, a conductive agent, and a filler may be further included in the positive electrode mixture as needed.

In general, the positive electrode current collector is manufactured so as to have a thickness of 3 μm to 500 μm. The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase adhesive force of the positive electrode active material. The positive electrode current collector may be configured in any of various forms, such as a film, a sheet, a foil, a net, a porous body, a foam body, and a non-woven fabric body.

The positive electrode active material is a material that is capable of inducing an electrochemical reaction. The positive electrode active material may be a lithium transition metal oxide including two or more transition metals. For example, the positive electrode active material may be, but is not limited to, a lithium nickel cobalt manganese composite oxide represented by the chemical formula $Li_{1+z}Ni_bMn_cCo_{1-(b+c+d)}M_dO_{(2-e)}A_e$ (where $-0.5 \leq z < 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si, or Y, and A=F, P, or Cl); or an olivine-based lithium metal phosphate represented by the chemical formula $Li_{1+x}M_{1-y}M'_yPO_{4-z}X_z$ (where M=a transition metal, preferably Fe, Mn, Co, or Ni, M'=Al, Mg, or Ti, X=F, S, or N, $-0.5 \leq x \leq 0.5$, $0 \leq y \leq 0.5$, and $0 \leq z \leq 0.1$).

The conductive agent is generally added so that the conductive agent accounts for 1 weight % to 30 weight % based on the total weight of the mixture including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; a conductive material, such as a polyphenylene derivative; or carbon nanotube may be used as the conductive agent.

The binder is a component assisting in binding between the active material and the conductive agent and in binding with the current collector. The binder is generally added in an amount of 1 weight % to 30 weight % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the electrode. There is no particular limit to the filler, as long as the filler is made of a fibrous material while the filler does not cause any chemical change in a battery to which the filler is applied. As examples of the filler, there may be used olefin-based polymers, such as polyethylene and polypropylene; and fibrous materials, such as glass fiber and carbon fiber.

For example, the negative electrode is manufactured by applying a negative electrode mixture including a negative electrode active material to a negative electrode current collector and drying the negative electrode mixture. The above-described components, i.e. the conductive agent, the binder, and the filler, may be further included in the negative electrode mixture as needed.

The negative electrode current collector is generally manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase binding force of the negative electrode active material, in the same manner as the positive electrode current collector. The negative electrode current collector may be configured in any of various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0<x \leq 1$; $1 \leq y \leq 3$; $1 \leq z \leq 8$); lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The binder, the conductive agent, and components added as needed are the same as in description of the positive electrode.

In addition, other components, such as a viscosity modifier and an adhesion promoter, may be further included selectively or in combination of two or more thereof.

The viscosity modifier is a component that adjusts viscosity of the electrode mixture such that a process of mixing the electrode mixture and a process of applying the electrode mixture onto the current collector are easily performed. The viscosity modifier may be added so as to account for up to 30 weight % based on the total weight of the negative electrode mixture. Carboxymethyl cellulose or polyvinylidene fluoride may be used as an example of the viscosity modifier. However, the present invention is not limited thereto. Depending on circumstances, the above-described solvent may also serve as the viscosity modifier.

The adhesion promoter is an auxiliary component that is added in order to increase the force of adhesion of the active material to the current collector, and may be added so as to account for 10 weight % or less, compared to the binder. For example, oxalic acid, adipic acid, formic acid, an acrylic acid derivative, or an itaconic acid derivative may be used as the adhesion promoter.

The separator is interposed between the positive electrode and the negative electrode, and an insulative thin film having high ion permeability and mechanical strength is used as the separator. The pore diameter of the separator generally ranges from 0.01 μm to 10 μm, and the thickness of the separator generally ranges from 5 μm to 300 μm. As the separator, for example, a sheet or non-woven fabric made of an olefin-based polymer, such as polypropylene, which exhibits chemical resistance and hydrophobicity, glass fiber, or polyethylene is used. In the case in which a solid electrolyte, such as a polymer, is used as an electrolyte, the solid electrolyte may also serve as the separator.

The non-aqueous electrolytic solution containing a lithium salt is composed of an electrolytic solution and a lithium salt, and a non-aqueous organic solvent, an organic solid electrolyte, or an inorganic solid electrolyte is used as the electrolytic solution.

For example, a non-protic organic solvent, such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate, may be used as the non-aqueous organic solvent.

For example, a polyethylene derivative, a polyethylene oxide derivative, a polypropylene oxide derivative, a phosphoric acid ester polymer, poly agitation lysine, polyester sulfide, polyvinyl alcohol, polyvinylidene fluoride, or a polymer containing an ionic dissociation group may be used as the organic solid electrolyte.

For example, a nitride, halide, or a sulfate of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$, may be used as the inorganic solid electrolyte.

The lithium salt is a material that is readily soluble in the non-aqueous electrolytic solution. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium phenyl borate, or imide may be used as the lithium salt.

In addition, in order to improve charge and discharge characteristics and flame retardancy, for example, pyridine, triethylphosphite, triethanolamine, cyclic ether, ethylenediamine, n-glyme, hexaphosphoric triamide, a nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, aluminum trichloride, or the like may be added to the electrolytic solution. Depending on circumstances, in order to impart incombustibility thereto, the electrolytic solution may further include a halogen-containing solvent, such as carbon tetrachloride or ethylene trifluoride. Furthermore, in order to improve the high-temperature retention characteristics thereof, the electrolytic solution may further include carbon dioxide gas. Moreover, fluoro-ethylene carbonate (FEC) and propene sultone (PRS) may be further included.

In a preferred example, a lithium salt, such as $LiPF_6$, $LiClO_4$, $LiBF_4$, or $LiN(SO_2CF_3)_2$, may be added to a mixed solvent of cyclic carbonate, such as ethylene carbonate (EC) or propylene carbonate (PC), which is a high dielectric solvent, and linear carbonate, such as diethyl carbonate (DEC), dimethyl carbonate (DMC), or ethyl methyl carbonate (EMC), which is a low viscosity solvent, to manufacture a non-aqueous electrolytic solution containing a lithium salt.

In addition, the present invention provides a battery pack including the secondary battery as a unit cell, and provides a device including the battery pack.

As concrete examples of the device, there may be small devices, such as a computer, a mobile phone, and a power tool, and medium to large devices, such as a power tool driven by a battery-powered motor, electric automobiles, including an electric vehicle (EV), a hybrid electric vehicle (HEV), and a plug-in hybrid electric vehicle (PHEV), electric two-wheeled vehicles, such as an electric bicycle (E-bike) and an electric scooter (E-scooter), an electric golf cart, a power storage device, and an energy storage system. However, the present invention is not limited thereto.

The battery pack and the device are well known in the art to which the present invention pertains, and thus a detailed description thereof will be omitted.

Hereinafter, the present invention will be described with reference to the following examples. These examples are provided only for easier understanding of the present invention and should not be construed as limiting the scope of the present invention.

Example 1

A porous separator substrate including a polyolefin-based polymer material was prepared, and one surface of the porous separator substrate was coated with inorganic slurry manufactured by dissolving $Al_2O_3$, as inorganic particles, and an acrylic binder resin in water in a weight ratio of 99:1 so as to have a coating thickness of 1.5 μm in order to manufacture a single-sided coated aqueous separator. The thickness of the single-sided coated aqueous separator was 12 μm.

In order to form a heat resistance layer, a coating slurry including 0.5 wt % of resol-based phenol based on solid content was prepared. The single-sided coated aqueous separator was coated with the coating slurry by deep coating to manufacture a separator having a total thickness of 12.1 μm and a heat resistance layer loading amount of 0.47 $g/m^2$.

Example 2

A separator having a total thickness of 12.1 μm and a heat resistance layer loading amount of 0.95 $g/m^2$ was manufactured using the same method as in Example 1, except that 1.0 wt % of resol-based phenol based on solid content was included, unlike Example 1.

Example 3

A separator having a total thickness of 12.1 μm and a heat resistance layer loading amount of 1.79 $g/m^2$ was manufactured using the same method as in Example 1, except that 2.0 wt % of resol-based phenol based on solid content was included, unlike Example 1.

Comparative Example 1

A separator having a total thickness of 12.0 μm was manufactured using the same method as in Example 1, except that no heat resistance layer was formed, unlike Example 1.

Comparative Example 2

A separator having a total thickness of 12.1 μm and a heat resistance layer loading amount of 2.2 $g/m^2$ was manufactured using the same method as in Example 1, except that 2.5 wt % of resol-based phenol based on solid content was included, unlike Example 1.

<Resistance Measurement Experiments>

In order to manufacture CR2016 coin cells, the separators manufactured according to Comparative Example 1, Comparative Example 2, and Example 1 to Example 3 were punched so as to have a size of 19 ø, and one drop of an electrolytic solution was added to the punched separators, whereby the coin cells were manufactured.

The coin cells were left for 3 hours, and then the resistance of the coil cells was measured using an electrochemical impedance spectroscopy (EIS) instrument.

Model 1255B made by Solartron Company was used as the EIS instrument, and a frequency of 104 to 105 Hz was applied. Values acquired by recording X-intercept values of a measured graph are shown in Table 1 below.

In the electrolytic solution, ethylene carbonate (EC), dimethyl carbonate (DMC), and ethyl methyl carbonate (EMC) were mixed in a ratio of 3:4:3. 3 mol of vinylene carbonate (VC), 1.5 mol of propanesultone (PS), 1 mol of ethylene sulfate (ESa), and 1 mol of $LiPF_6$, as a lithium salt, were included as additives.

<Heat Shrinkage Measurement Experiments>

The separators manufactured according to Example 1 to Example 3, Comparative Example 1, and Comparative Example 2 were left for 30 minutes under a temperature condition of 150° C., and then shrinkage of the separators was measured.

The shrinkage is the result acquired by marking two arbitrary points in an MD direction and a TD direction of each separator and calculating a rate of change in distance between the points (gauge length) according to Equation 1 below.

$$\text{Shrinkage } (\%)=\{(B-A)/A\}\times 100 \quad \text{(Equation 1)}$$

In the above equation, A indicates the gauge length in an initial state before being left at a high temperature, and B indicates the gauge length in a final state after being left at a high temperature.

Permeability measurement results and heat shrinkage measurement results are shown in Table 1 below.

TABLE 1

| | Comparative Example 1 (Control group) | Example 1 | Example 2 | Example 3 | Comparative Example 2 |
|---|---|---|---|---|---|
| Content of resol-based phenolic resin (wt %) | 0 | 0.5 | 1.0 | 2.0 | 2.5 |
| Total thickness of separator (μm) | 12.0 | 12.1 | 12.1 | 12.1 | 12.1 |
| Heat resistance layer loading amount ($g/m^2$) | 0 | 0.47 | 0.95 | 1.79 | 2.20 |
| Resistance (ohm) | 0.62 | 0.63 | 0.70 | 0.85 | 1.25 |
| Heat shrinkage (%, MD) | 70 | 56 | 45 | 6 | 2 |
| Heat shrinkage (%, TD) | 64 | 52 | 42 | 3 | 0 |

Referring to Table 1 above, it can be seen that, when comparing the resistance of each of the separators manufactured according to Examples, in which the heat resistance layer was formed, with the resistance of the separator manufactured according to Comparative Example 1, in which no heat resistance layer was formed, there is no great difference between the resistance of each of the separators manufactured according to Examples and the resistance of the separator manufactured according to Comparative Example 1, and in particular, the resistance of the separator manufactured according to Example 1 and the resistance of the separator manufactured according to Example 2 are similar to the resistance of the separator manufactured according to Comparative Example 1.

It seems to be that the separator manufactured according to Comparative Example 2, in which 2.5 wt % of resol-based phenol was included, has too high resistance, whereby ionic conductivity of the separator is reduced, and therefore it is difficult for the separator to perform a normal function in the battery cell.

In examining heat shrinkage, MD-direction and TD-direction heat shrinkage of each of the separators manufactured according to Example 1 to Example 3 at 150° C. was measured to be 60% or less. In particular, heat shrinkage of the separator manufactured according to Example 2 was measured to be 50% or less, and heat shrinkage of the separator manufactured according to Example 3 was measured to be 10% or less. Consequently, it can be seen that, as the content of the resol-based phenolic resin in the heat resistance layer is increased, heat shrinkage is improved. In a battery cell manufactured using the separator according to the present invention, shrinkage of the separator at a high temperature is prevented, whereby remarkable improvement of a short circuit prevention effect is predictable.

When the content of the resol-based phenolic resin was 2.5 wt %, as in Comparative Example 2, MD-direction heat shrinkage was 2%, and TD-direction heat shrinkage was 0%. Since resistance is high although heat resistance is very excellent, it may be difficult to normally exhibit the performance of the battery cell.

FIG. 2 is an FE-SEM photograph of the surface of the separator manufactured according to Example 1, FIG. 3 is an FE-SEM photograph of the surface of the separator manufactured according to Example 2, FIG. 4 is an FE-SEM photograph of the surface of the separator manufactured according to Example 3, and FIG. 5 is an FE-SEM photograph of the surface of the separator manufactured according to Comparative Example 1.

Referring to FIGS. 2 to 5, it can be seen that, as the content of resol-based phenol in the heat resistance layer is increased, the area in which the inorganic layer is coated with the heat resistance layer is increased at the top of the separator, and the area in which the surface of the polyolefin-based separator substrate is coated with the heat resistance layer is increased at the back of the separator. However, the separator manufactured according to Comparative Example 1 shown in FIG. 5 is not coated with the heat resistance layer, and therefore the inorganic particles and the polyolefin-based separator substrate are visible.

FIG. 4 shows the state in which almost the entirety of each of the top and the back of the separator is coated with the heat resistance layer. In the case in which the content of resol-based phenol is higher, as in Comparative Example 2, resistance becomes too high, as can be seen from the measured value shown in Table 1 above, whereby the performance of the battery may be deteriorated.

In the case in which the content of resol-based phenol included in the heat resistance layer is less than 2 wt % and optionally the loading amount is less than 2.0 $g/m^2$, therefore, ionic conductivity is secured, whereby it is possible to provide a separator having low resistance and improved heat resistance characteristics.

<Dynamic Mechanical Analysis (DMA) Evaluation Experiments>

In order to evaluate high-temperature characteristics of the separators manufactured according to Comparative Example 1 and Example 1 to Example 3, stress depending on temperature change was measured. FIG. 6 shows a DMA evaluation graph.

DMA evaluation experiments were performed using model DMA840 made by TA Company.

Each separator was cut so as to have a width of 0.5 mm and a length of about 5 cm, and the cut separator was connected to a load cell. A preload of 0.01 mN was applied in an isostrain mode using a DMA instrument, and the temperature was increased from 25° C. to 200° C. at a rate of 10° C./min. At this time, strain of each separator sample was measured.

Referring to FIG. 6, it can be seen that the separator manufactured according to Comparative Example 1 was ruptured at about 220° C., whereas rupture of the separators manufactured according to Example 1 to Example 3 including the heat resistance layer was delayed until the temperature reached 250° C. or higher.

Therefore, it can be seen that, when the separator according to the present invention is used, heat resistance is remarkably improved.

Those skilled in the art to which the present invention pertains will appreciate that various applications and modifications are possible within the category of the present invention based on the above description.

The invention claimed is:

1. A separator for a lithium secondary battery, the separator comprising:

a separator substrate comprising a porous polymer resin; and a heat resistance layer on at least one side of the separator substrate, the heat resistance layer comprising a phenolic resin configured to be hardened by self-curing when heated, wherein the phenolic resin comprises a resol-containing phenolic resin, and the resol-containing phenolic resin is present in the heat resistance layer in an amount ranging from 0.5 wt % to 2.0 wt % based on a total solid content of the heat resistance layer, and wherein a loading amount of the heat resistance layer on the separator substrate is 0.47 $g/m^2$ or more and less than 2.0 $g/m^2$.

2. The separator according to claim 1, wherein an inorganic layer is present between the separator substrate and the heat resistance layer.

3. The separator according to claim 1, wherein a machine direction and a transverse direction heat shrinkage of the separator at 150° C. is 60% or less.

4. The separator according to claim 1, wherein an inorganic layer is present on a first surface of the separator substrate, and the heat resistance layer is present on an upper surface of the inorganic layer and a second surface of the separator substrate on which the inorganic layer is not formed.

5. The separator according to claim 1, wherein the separator is an aqueous separator.

6. A cylindrical lithium secondary battery having a structure in which an electrode assembly comprising the separator according to claim 1 is received in a cylindrical battery case.

7. A battery pack comprising the cylindrical lithium secondary battery according to claim 6 as a unit cell, wherein the battery pack is suitable for use as an energy source of an electric vehicle, a hybrid electric vehicle, a plug-in hybrid electric vehicle, or an energy storage system.

* * * * *